United States Patent [19]

Borror et al.

[11] 3,976,493

[45] Aug. 24, 1976

[54] PHOTOSENSITIVE COMPOSITIONS CONTAINING LINKED SPECTRAL SENSITIZERS

[75] Inventors: Alan L. Borror, Lexington; Louis Cincotta, Andover, both of Mass.

[73] Assignee: Polaroid Corporation, Cambridge, Mass.

[22] Filed: Feb. 18, 1975

[21] Appl. No.: 550,181

[52] U.S. Cl. ............................ 96/128; 96/127; 260/240.1
[51] Int. Cl.² .................................... G03C 1/10
[58] Field of Search ............................ 96/128, 127

[56] References Cited
UNITED STATES PATENTS

| 2,425,772 | 8/1947 | Wilson | 96/128 |
| 2,465,774 | 3/1949 | Wilson | 96/128 |
| 2,652,396 | 9/1953 | Keyes et al. | 96/128 |
| 2,944,896 | 7/1960 | Riester | 96/128 |
| 3,622,317 | 11/1971 | Bird et al. | 96/128 |

Primary Examiner—J. Travis Brown
Attorney, Agent, or Firm—Mart C. Matthews; Philip G. Kiely

[57] ABSTRACT

Spectral sensitivity is imparted to a photosensitive material by novel linked sensitizing dye compounds having an alkylene-amide linking moiety.

5 Claims, No Drawings

PHOTOSENSITIVE COMPOSITIONS CONTAINING LINKED SPECTRAL SENSITIZERS

BACKGROUND OF THE INVENTION

1. Field of the Invention

This invention deals with photography and, more specifically, with novel products and processes wherein the spectral response of various photosensitive materials is extended by the use of novel linked spectral sensitizing dyes.

2. Description of the Prior Art

As understood in the art and as herein used, the term "spectral sensitizing dyes" refers to compositions which extend the response of photosensitive materials to radiation to which the material normally is substantially insensitive. In general, the procedure of spectral sensitization of photosensitive material, and preferably sensitization of photosensitive silver halide, is accomplished by the adsorption onto one or more surfaces of the photosensitive material of one or more of the aforesaid spectral sensitizing dyes selected from certain classes of dyes including preferably, cyanine dyes and dyes related to them. For an extensive treatment of cyanine and related dyes particularly adapted to provide spectral sensitization of, for example, a photosensitive silver halide crystal, see Hamer, F. M., *The Cyanine Dyes And Related Compounds*, Interscience Publishers, New York, New York, U.S.A. (1964); or, Mees, C. E. K., and James, T. H., *The Theory Of The Photographic Process*, 3rd Edition, the Macmillan Co., New York, New York, U.S.A. (1966), pp. 198–232.

Cyanine dyes and related compounds are well known particularly in the art of photographic chemistry. The most common "true" cyanine dyes have a chromophoric structure which conforms to an amidinium ion system in which two nitrogen atoms are included in separate heterocyclic ring systems connected by a conjugated chain of methine groups. The aforementioned dyes are usually prepared by condensation reactions, conducted in the presence of a basic condensing agent, involving a pair of heterocyclic quaternary salts, one having at least one active methyl substituent and the other having at least one proton-seeking (negative) group capable of condensing with the aforementioned methyl substituent.

In compounds related to the cyanines, the chromophoric structure of the dye is similar to that of the true cyanines just described, but may include a carboxyl ion system or amidic system wherein either or both of the two nitrogen atoms of the amidinium ion system is replaced with an oxygen atom. The merocyanine dyes are an example of cyanine-related compounds wherein a typical cyanine dye heterocyclic nucleus is linked through a conjugated methine bridge with a nucleus derived from an acidic ketomethylene compound, e.g., 3-ethylrhodanine.

Various "linked" (i.e., "bis", "polymeric", "pseudopolymeric", "double", "poly-nuclear", etc.) cyanine dyes have been described in the photographic and chemical arts as spectral sensitizers. In the patent literature, such linked cyanine compounds have been described in, for example, U.S. Pat. Nos. 2,393,351; 2,425,772; 2,425,773; 2,425,774; 2,518,731; 2,641,137; 2,592,196; and 3,622,317. In the prior art represented by the above-cited patents, a hydrocarbon chain, e.g., an alkylene chain joining one amidinium nitrogen of one cyanine dye segment to that of another, a poly-methine chain joining carbon atoms, etc., is commonly used as the linking group. Such prior art linked cyanine dye compounds often involve complicated or impractical syntheses which, in many instances, result in a mixture of products from which it is difficult to separate a pure product.

Novel linked sensitizing dye compounds are herein provided which do not exhibit the above-described deficiencies of the prior art and can be readily prepared in excellent yields.

BRIEF SUMMARY OF THE INVENTION

In accordance with the present invention, a photosensitive material, preferably silver halide, is spectrally sensitized with a novel compound comprising two spectral sensitizing dye segments linked together through a divalent alkylene amide chain. The individual sensitizing dye segments may commmprise a cyanine dye or a related compound such as a merocyanine dye. The alkylene-amide linking chain is particularly advantageous in that the two heterocyclic salts can be readily joined through the formation of the amide bond, the length of the chain may be easily changed to suit particular needs and the group is stable throughout the various condensation reactions employed to form the individual dye segments.

The novel sensitizing dyes of the invention may be employed to accomplish spectral sensitization of a photoresponsive material, particularly a photographic silver halide emulsion, in accordance with traditional procedures disclosed in the art. The dyes of the invention are especially advantageous in those photographic systems wherein linked or "pseudo-polymeric" spectral sensitizing dyes provide a radiation-less circuit capable of transmitting photon excitation derived energy to silver halide crystals so as to enhance the photoresponse thereof, for example, as disclosed and claimed in the aforementioned U.S. Pat. No. 3,622,317.

DETAILED DESCRIPTION OF THE PREFERRED EMBODIMENT

As previously characterized, the present invention is directed to photosensitive compositions comprising novel linked spectral sensitizing dyes. The sensitizing dyes of the invention may be represented by the formula:

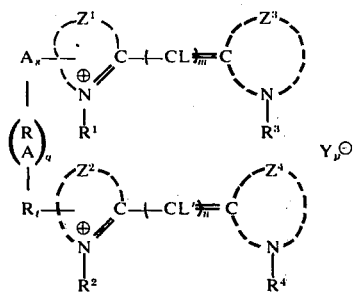

wherein $Z^1$, $Z^2$, $Z^3$ and $Z^4$ each represent the non-metallic atoms necessary to complete a heterocyclic ring system containing at least one 5- or 6-membered heterocyclic nucleus; $R^1$, $R^2$, $R^3$ and $R^4$ each represent a substituent commonly employed on cyanine nitrogen atoms, e.g., an alkyl group, substituted alkyl group, aryl group, aralkyl group, cycloalkyl group, etc.; each R is the same or different and represents an alkylene group, e.g., an alkylene group havng from 1 to 5 carbon atoms; each A is a divalent amide group, i.e.,

L and L' are each a hydrogen atom, lower alkyl group, i.e., an alkyl group having from 1 to 4 carbon atoms inclusive, or an aryl group, e.g., phenyl; Y is an acid anionic radical; $m$ and $n$ are each a positive integer from 1 to 7 inclusive; $s$ and $t$ are each 0 or 1; and $p$ and $q$ are each 0, 1 or 2.

As examples of heterocyclic ring systems contemplated by $Z^1$, $Z^2$, $Z^3$ and $Z^4$, mention may be made of the traditional art recognized heterocyclic ring systems customarily employed as constituent components of cyanine dyes such as heterocyclic ring systems of the azole series including those of the thiadiazole and thiazole series, for example, thiazole; 4-methylthiazole, 4-phenylthiazole; 5-methylthiazole; 5-phenylthiazole; 4,5-dimethylthiazole, 4,5-diphenylthiazole; 4-(2-thienyl)-thiazole, etc.; of the benzothiazole series, for example, benzothiazole; 4-chloro-benzothiazole; 5-chloro-benzothiazole; 6-chloro-benzothiazole; 7-chloro-benzothiazole; 4-methyl-benzothiazole; 5-methyl-benzothiazole; 6-methyl-benzothiazole; 6-bromo-benzothiazole; 4-phenyl-benzothiazole; 5-phenyl-benzothiazole; 4-methoxy-benzothiazole; 5-methoxy-benzothiazole; 6-methoxy-benzothiazole; 5-iodo-benzothiazole; 6-iodo-benzothiazole; 5-ethoxy-benzothiazole; 6-ethoxy-benzothiazole; 5,6-dimethoxy-benzothiazole; 5-hydroxy-benzothiazole; 6-hydroxy-benzothiazole; 5-bromo-benzothiazole; 4-ethoxy-benzothiazole; tetrahydro-benzothiazole; 5,6-dioxymethylene-benzothiazole; etc.; and of the naphthothiazole series, for example, $\alpha$-naphthothiazole; $\beta$-naphthothiazole; $\beta,\beta$-naphthothiazole; 5-methoxy-$\beta$-naphthothiazole; 5-ethoxy-$\beta$-naphthothiazole; 7-methoxy-$\beta$-naphthothiazole; 8-methoxy-$\alpha$-naphthothiazole; etc.; those of the selenazole series, for example, 4-methylselenazole; 4-phenylselenazole; etc., including those of the benzoselenazole series, for example, benzoselenazole; 5-chloro-benzoselenazole; 5-methoxy-benzoselenazole; 5-hydroxy-benzoselenazole; tetrahydro-benzoselenazole; etc.; and of the naphthoselenazole series, for example, $\beta$-naphthoselenazole; $\alpha$-naphthoselenazole; etc.; those of the oxadiazole and oxazole series, for example, 5,methyloxazole; 4-phenyloxazole; 4,5-diphenyloxazole; 4-methyloxazole; 5-phenyloxazole; 4,5-dimethyloxazole; etc., including those of the benzoxazole sries, for example, benzoxazole; 5-methylbenzoxazole; 6-methylbenzoxazole; 5,6-dimethylbenzoxazole; 5-methoxybenzoxazole; 5-phenylbenzoxazole; 5-carboxybenzoxazole; 5-sulfobenzoxazole; 5-chloro-benzoxazole; 5-sulfomylbenzoxazole; 6-dialkyl-amino-benzoxazole; 5-ethoxybenzoxazole; 6-methoxybenzoxazole; etc.; and of the naphthoxazole series, for example, 4,5-benzobenzoxazole; 5,6-benzobenzoxazole; 6,7-benzobenzoxazole; etc,; and those of the imidazole series, for example, 1-ethylimidazole; 1-ethyl-4-phenylimidazole; 1-ethyl-4,5-dimethylimidazole; etc.; of the benzimidazole series, for example, 5-chloro-benzimidazole; 5,6-dichloro-benzimidazole; 5-trifluoromethyl-benzimidazole; . 5-cyanobenzimidazole; 5-carboxybenzimidazole; 5,6-dimethylbenzimidazole; etc.; and of the azine series including those of the pyridine series such as the 2-pyridine series, for example, pyridine; 3-methylpyridine; 4-methylpyridine; 5-methylpyridine; 3,4-dimethylpyridine; 3,5-dimethylpyridine; 3,6-dimethyl-2-pyridine; 4,5-dimethyl-2-pyridine; 4-chloro-2-pyridine; 5-chloro-2-pyridine; 6-chloro-2-pyridine; 3-hydroxy-2-pyridine; 4-hydroxy-2-pyridine; 5-hydroxy-2-pyridine; 2-phenyl-2-pyridine; 6-phenyl-2-pyridine; etc.; of the 4-pyridine series, for example, 2-methyl-4-pyridine; 3-methyl-4-pyridne; 2-chloro-4-pyridine; 3-chloro-4-pyridine; 2,3-dimethyl-4-pyridine; 2-hydroxy-4-pyridine; 3-hydroxy-4-pyridine; etc.; of the pyrroline series; of the piperidine series; of the pyrimidine series; of the triazine series; of the thiazine series; of the thiazoline series, for example, thiazoline; 4-methyl-thiazoline; etc.; of the indolenine series such as of the 3,3-dialkyl-indoline series, for example, 3,3-dimethylindolenine; etc.; and of the quinoline series such as of the 2-quinoline series, for example, 2-quinoline; 3-methyl-2-quinoline; 5-methyl-2-quinoline; 7-methyl-2-quinoline; 6-chloro-2-quinoline; 8-chloro-2-quinoline; 6-methoxy-2-quinoline; 6-ethoxy-2-quinoline; 6-hydroxy-3-quinoline; 8-hydroxy-2-quinoline; etc.; and of the 4-quinoline series, for example, 4-quinoline; 6-methoxy-4-quinoline; 6-methoxy-4-quinoline; 7-methyl-4-quinoline; 8-methyl-4-quinoline; etc.

In preferred linked cyanine dye compounds, $Z^1$ and $Z^2$ may each be selected from ring systems of the benzimidazole or benzothiazole series, $Z^3$ may be selected from ring systems of the benzothiazole, benzoxazole, benzoselenazole, and benzimidazole series; and $Z_4$ may be selected from ring systems of the benzothiazole series.

It should be understood that when reference herein, including the appended claims, is made to a ring system of a particular series it is intended to include the named heterocyclic group and any of the substituents or fused rings customarily present thereon in cyanine dyes and related compounds. As examples of such substituents known in the art, reference may be made of alkyl, halogen, alkoxy, hydroxy, aralkyl, aryl, acyl, cyano, carboxamido, carbamyl, sulfonamido, sulfamyl, thio, etc., as well as fused rings such as phenylene, pyridino, pyrimidino, etc.

In preferred linked merocyanine dyes of the invention, $Z^3$ and $Z^4$ in Formula I may be selected from heterocyclic ketomethylene ring systems traditionally employed in such dyes, for example, ring systems having nuclei of the thiazolone series, e.g., 2-thio-2,4-thiazole-dione (rhodanine); oxazolone series, e.g., 2-thio-2,4-oxazole-dione and 2-imino-2,4-oxazole dione (pseudo-hydantoin); imidazolone series, e.g., 2,4-imidazole-dione (hydantoin); pyrazolone series, e.g., oxindole (2,3-dihydroketoindole), 2,4,6-triketohexahydropyrimidine (barbituric or thiobarbituric acid); 3,4-dihydroquinoline series, e.g., 3,4-dihydroquinoxazolone, 1,4-morpholine-3-one and 2H-1,4-benzothiazine-3-one, etc. Such merocyanine dyes are preferably dimethine merocyanines wherein m and n are each the integer 2.

It will be appreciated by those skilled in the art that $R^1$, $R^2$, $R^3$ and $R^4$ in Formula I may be any of the substituents customarily found on the quaternary nitrogen atoms of cyanine dyes and related compounds. As examples of suitable substituents, mention may be made of alkyl groups such as methyl, ethyl, propyl, isopropyl, butyl, isobutyl, etc., including substituted alkyl groups such as alkoxy alkyl, e.g., $\beta$-methoxyethyl, $\beta$-ethoxyethyl, etc.; hydroxyalkyl e.g., $\beta$-hydroxyethyl, $\beta$- hydroxypropyl, γ-hydroxyethyl; aralkyl, e.g., benzyl, β-phenethyl, etc.; carboxyalkyl, e.g., carboxymethyl, α-carboxyethyl, β-carboxyethyl, γ-carboxy propyl, S-carboxybutyl, etc.; sulfoalkyl, e.g., sulfomethyl, β-sulfoethyl, γ-sulfopropyl, S-sulfobutyl, p-sulfobenzyl, etc.; and carbalkoxyalkyl, e.g., carbmethoxymethyl, β-carbmethoxyethyl, carbethoxymethyl, β-carbethoxyethyl, etc.; as well as aryl groups such as phenyl including substituted aryl groups such as carboxyphenyl; or cycloalkyl groups such as cyclohexyl.

The moieties —CL= and —CL'= each represent the methine groups traditionally found in the conjugated carbon chain connecting heterocyclic nuclei of cyanine dyes and related compounds. As indicated in Formula I by subscripts m and n, the methine chain of any one dye segment may comprise one methine group (e.g., as in the "simple" 2'-cyanines), two methine groups (e.g., dimethine merocyanines), three methine groups (e.g., carbocyanines), four methine groups (e.g., tetramethine merocyanines), five methine groups (e.g., dicarbocyanines), six methine groups (e.g., hexamethine merocyanines), or seven methine groups (e.g., tricarbocyanines). In particularly preferred embodiments, both linked dye segments are carbocyanines and the methine groups may optionally include a substituent L or L' preferably at the central or "meso" position on the trimethine chain.

Y represents the anionic acid radical or radicals customarily employed in the cyanine dye art to satisfy the positive charge of the amidinium ion system such as, for example, chloride, bromide, iodide, methylsulfate, p-toluenesulfonate, benzenesulfonate, acetate, propionate, cyanate, perchlorate, etc. When subscript p is 2, Y represents the two anionic radicals necessary to satisfy the positive charges on the amidinium ion system of each cyanine dye segment. The individual cyanine dye segments may also exhibit an "internal salt" or "zwitterion" form wherein the anion takes the form of a negatively charged substituent $R^1$, $R^2$, $R^3$ or $R^4$, e.g., $-SO_3^-$ or $COO^-$. In the latter case, there may be no external anion (p=0) or one external anion (p=1) depending upon whether one or both cyanine dye segments exhibit the internal salt form. It should be understood that all formulae set forth herein, including those in the claims, represent only an illustration of one form of structure and that the actual cyanine dye segments may be a resonance hybrid of a series of structures including uncharged species, all according to known principles in the art.

As indicated above, R represents an alkylene group such as, for example, $-CH_2-$, $-(CH_2)_2-$, $-(CH_2)_3-$, etc., and A represents a divalent amide group, i.e.,

The length of the linking chain may be varied depending upon the number of amide and alkylene groups introduced into the chain, as well as upon the number of carbon atoms in the alkylene groups. Longer linking chains may tend to limit the solubility of the compound and also may decrease the efficiency of photon excited energy transfer through the molecule, whereas shorter chains may tend to increase any steric hindrance problems during the synthesis of the double dyes. The optimum length will be governed by the desired results and the particular photographic application, for example, as described hereinafter in relation to a preferred photographic system. Preferably, q in Formula I is 2 or less, and the size of the alkylene groups R range from 1 to 5 carbon atoms.

The sensitizing dye compounds of the invention are condensation derivatives of a novel "bis-type" quaternary salt having the formula:

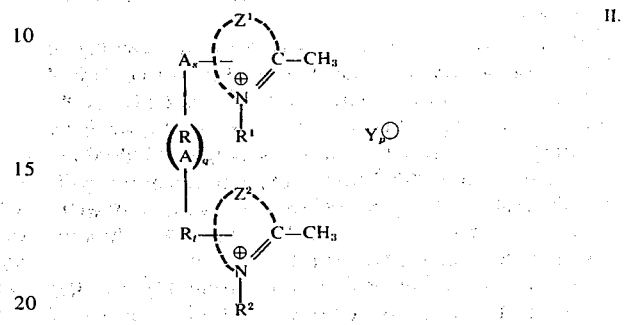

wherein the indicated groups have the definitions previously set forth. Such "bis-type" salts are readily prepared by reacting a first heterocyclic salt having a substituent with a free carboxylic acid functionality and a second heterocyclic salt having a substituent with a free primary amino functionality, thereby joining the two compounds through the formation of an amide bond. Additional amide and alkylene groups can be introduced into the chain by conventional chemical methods prior to the above linking reaction, for example, as illustrated in detail in Example I hereinafter.

Particularly advantageous bis-type quaternary salts of the type just described are the subject matter of copending application Ser. No. 550,182, filed concurrently herewith and herein incorporated by reference in its entirety.

As briefly stated before, the sensitizing dyes of the invention are condensation products of the above-described bis-type quaternary salts and appropriate heterocyclic dye intermediates which will condense with the active methyl groups of the double salt to complete the individual dye segments. The condensation reactions are conventional in the cyanine dye art and are preferably conducted in the presence of a basic condensing agent and heat in a substantially inert reaction medium such as a lower molecular weight alcohol, e.g., ethyl, n-propyl, isopropyl, n-butyl or isobutyl alcohol; a glycol ether such as 2-methoxyethanol, or other solvents such as dimethylsulfonamide, tricresylphosphate or a phenol; or in a reaction medium which itself comprises the condensing agent such as pyridine. The basic condensing agent may comprise an organic amine, for example, tri-n-propylamine, tri-n-butylamine, triisoamylamine, triethylamine, trimethylamine, dimethylaniline, diethylaniline, pyridine, N-alkylpiperidine, etc., and most preferably an organic tertiary amine having a dissociation constant greater than pyridine ($1 \times 10^{-5}$); an alkali metal carboxylate in a carboxylic anhydride, for example, sodium acetate in acetic anhydride; etc.; or an alkali metal hydroxide, for example, sodium hydroxide, potassium hydroxide, etc.

When only one mole of the dye intermediate condenses with one mole of the double quaternary salt intermediate, a sensitizing dye is formed which contains one dye segment linked to an active quaternary salt segment, a so-called "mono dye" compound. A "double dye" compound may subsequently be prepared from the "mono dye" by condensing one mole of the latter with another mole of the aforementioned active dye intermediate, which may be the same as or different than the one employed to form the "mono dye". A "double dye" may be prepared directly if two moles of the appropriate dye intermediate are condensed with one mole of the double quaternary salt intermediate.

When the synthesis of the above materials results in a mixture of products, separation of the desired linked cyanine dye from the mixture may be accomplished by conventional separation procedures. A particularly advantageous procedure for separating the "double" cyanine dyes from the "mono" cyanine dye intermediates described above comprises a chromatographic separation employing 95% dichloroethane/5% dimethylformamide as the solvent on basic alumina.

For purposes of illustration and not limitation of the invention, the synthesis of preferred double carbocyanine dyes of the invention will now be discussed in detail.

Such preferred double carbocyanine dyes may be represented by one of the formulae: III.

In a preferred synthesis, one mole of a bis-type quaternary salt of Formula II, preferably wherein $Z^1$ is a ring system of the benzothiazole series and $Z^2$ is a ring system of the benzothiazole or benzimidazole series, may be condensed, in the presence of a basic condensing agent, such as triethylamine, as previously described, with at least one mole of a heterocyclic compound having the formula:

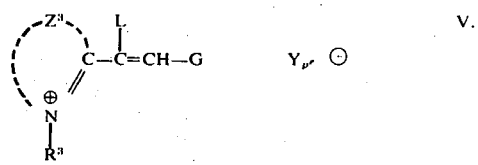

V.

wherein $Z^3$, $R^3$, L and Y all have the definitions previously given; G is a proton-seeking (negative) group adapted to condense with the active methyl group to form a tri-methine cyanine linkage, for example, a $\beta$-anilino group, a $\beta$-alkyl mercapto group, a $\beta$-aryl mercapto group, a $\beta$-(p-tolusulfonanilido) group, etc., and $p'$ is 0 or 1 depending upon whether $R^3$ is negatively charged or neutral, respectively. The product of the above reaction is what may be termed a "mono

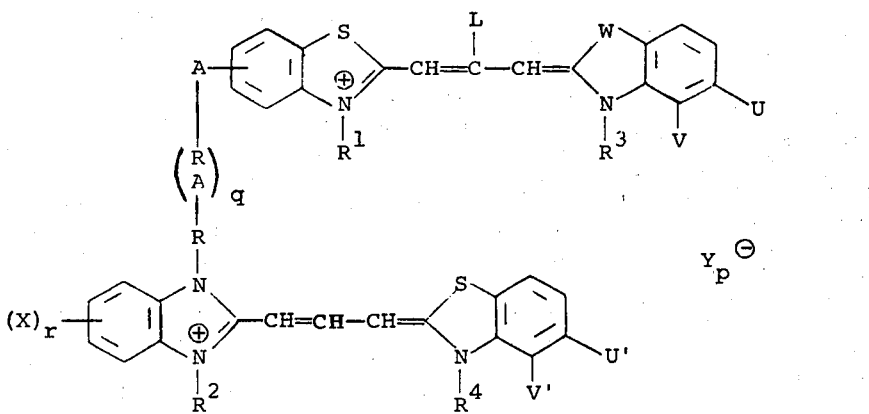

or

IV.

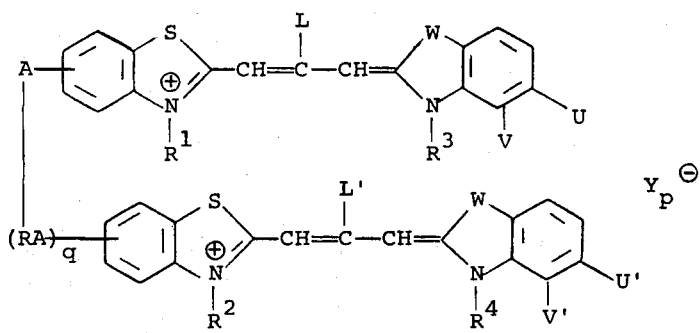

wherein A, R, L, L', $R^{1-4}$, Y, p and q all wherein the definitions previously given, and W is S, O, Se or N-T wherein T is hydrogen or a lower alkyl group; X is hydrogen, halo (e.g., chloro, bromo, fluoro, etc.) cyano or carbalkoxy (e.g., carbmethoxy, carbethoxy, etc.); r is 1 or 2; U and U' are each hydrogen, a lower alkyl group, phenyl or cyano, and V and V' are each a hydrogen atom; or U and V taken together and/or U' and V' taken together represent a fused phenylene nucleus.

dye" in that a complete cyanine dye segment has been formed from one active methyl group, and has linked thereto through the alkylene-amide chain a quaternary salt segment having a reactive methyl group available for further dye condensation. Such mono dyes have been found to be spectral sensitizers in their own right.

As more fully described in the aforementioned copending application, relatively few of the dye intermediates of Formula V have been found to be suitable for condensation with both methyl groups of the bis-type quaternary salt, or with the remaining active methyl group of the mono dye, apparently because of steric hindrance and other considerations. One heterocyclic compound of Formula V which has been found to be particularly suitable for condensation in the presence of a basic condensing agent with both reactive methyl groups of the bis-type salt, as well as the remaining methyl group of the mono dye to form preferred double carbocyanine dyes, may be represented by Formula V when G is a β-anilino group and $Z^3$ is a ring system of the benzothiazole series.

As specific examples of some preferred sensitizing dyes within the scope of the invention, mention may be made of the following compounds, which are listed for the purposes of illustration and are not intended to limit the invention:

A.
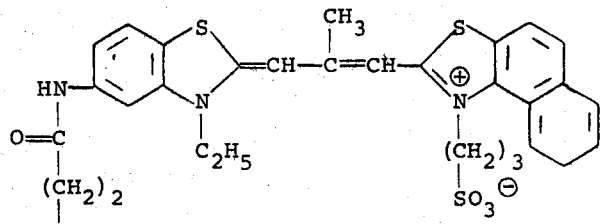
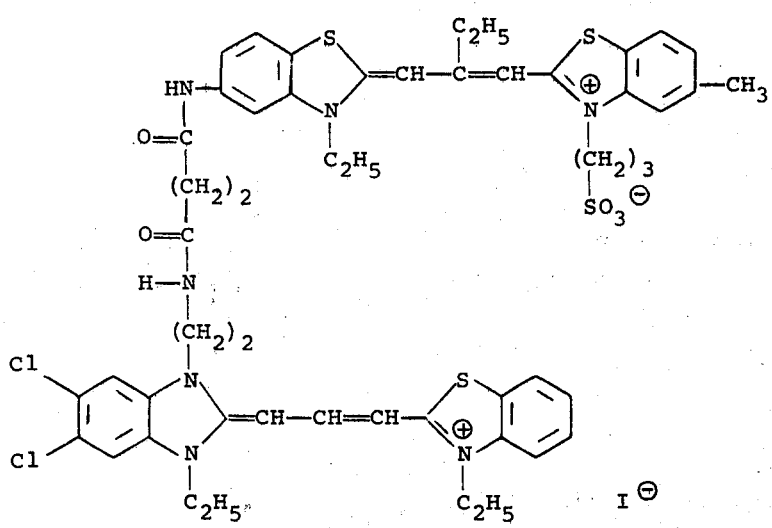

B.
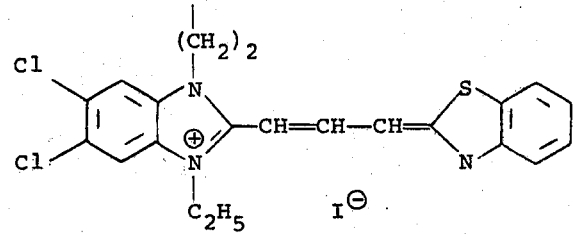

C.
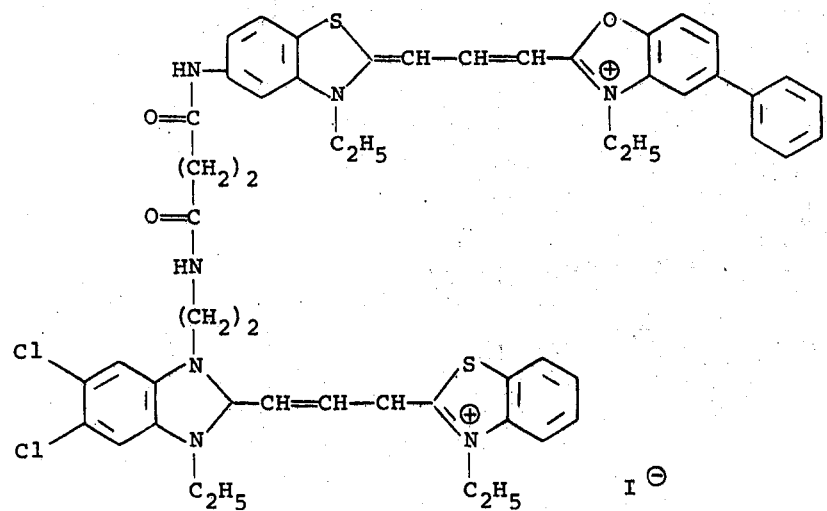

D. 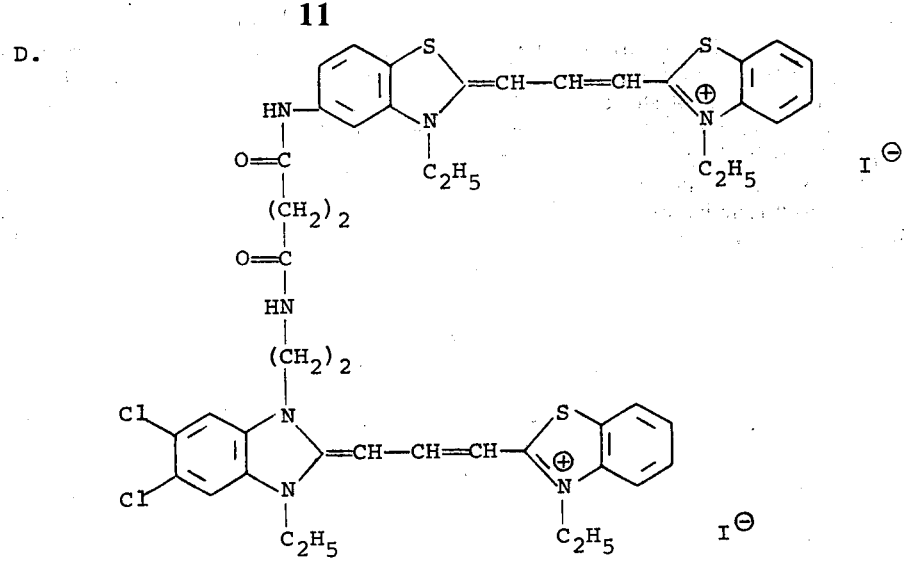
E. 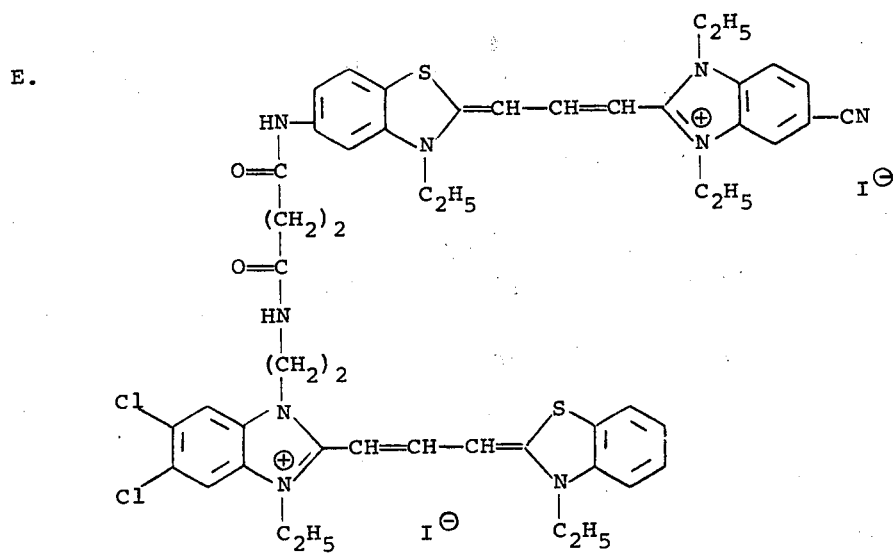
F. 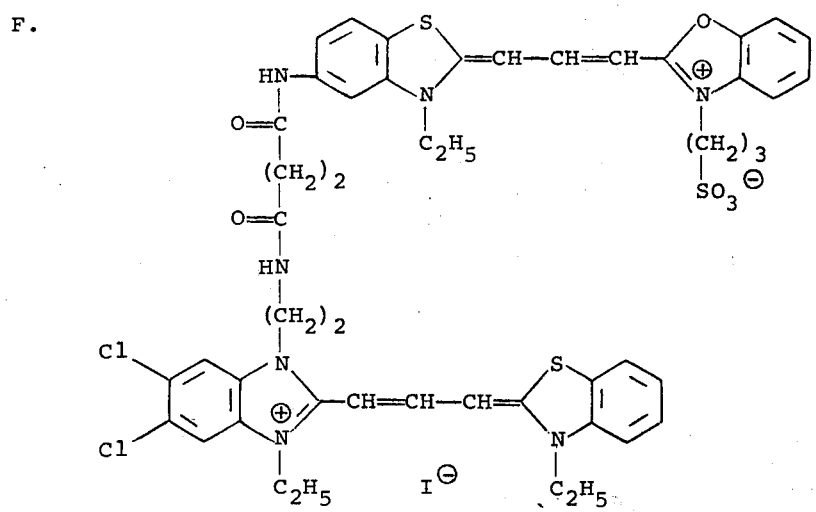

G. 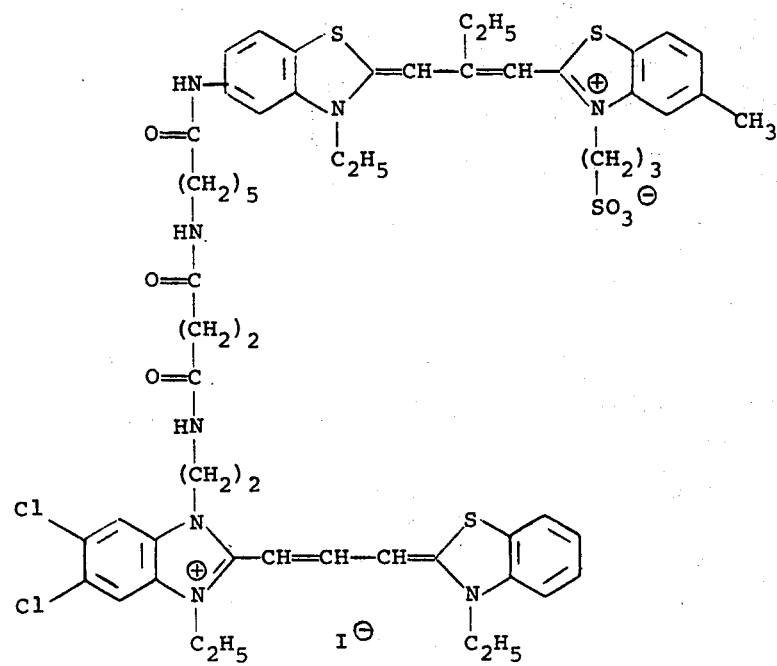
H. 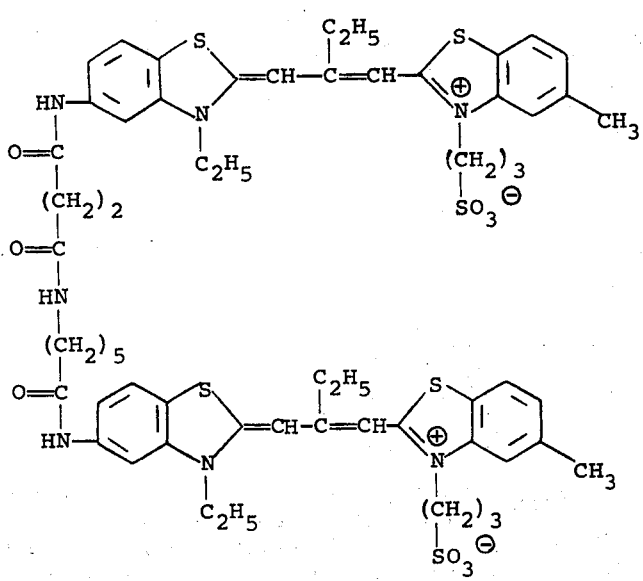
I. 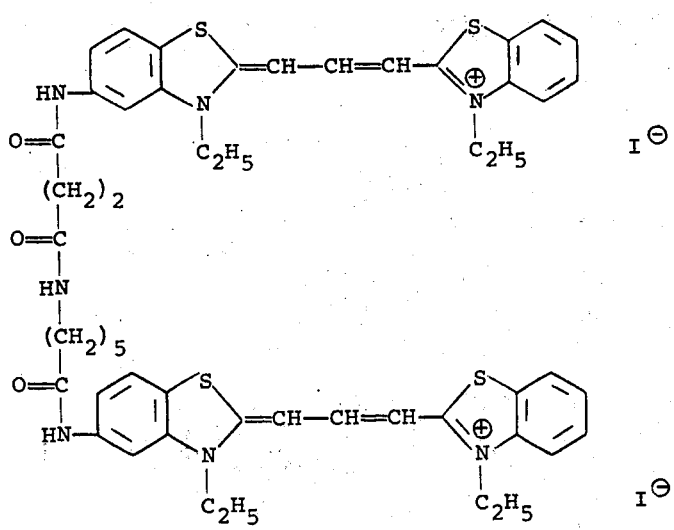

J.

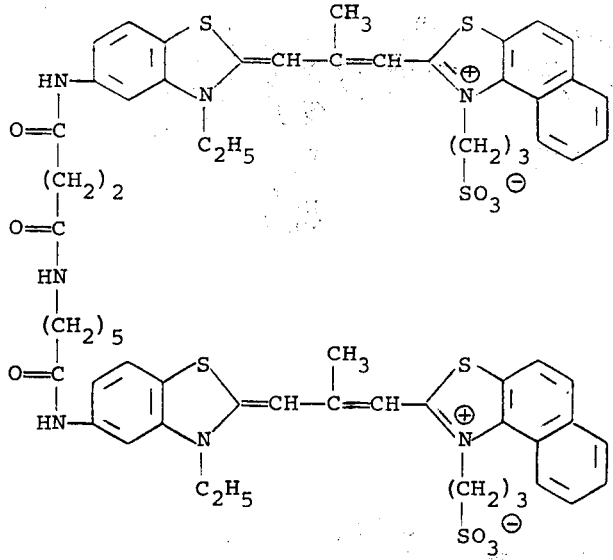

K.

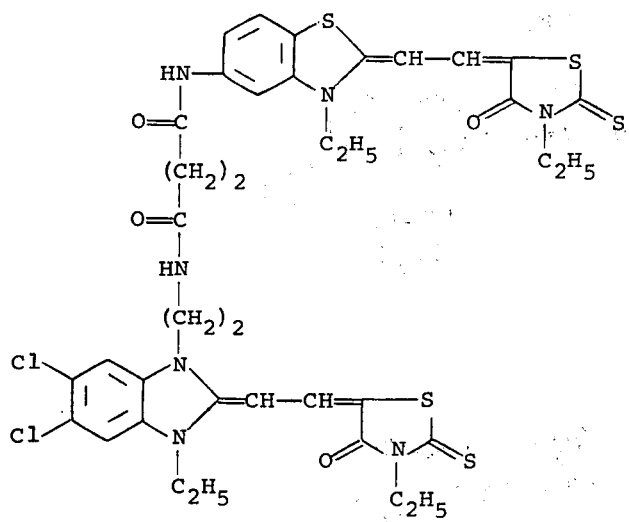

For a clearer understanding of the preparation of the novel sensitizing dyes of the invention, reference is now made to the following examples which detail representative synthetic procedures for preferred dye compounds.

EXAMPLE I

A. Formation of a double quanternary salt intermediate ("double quat")

A solution of (L) was prepared by refluxing 28 g. of the corresponding phthalimide derivative of (L) with 8.2 g. of hydrazine hydrate in 1700 ml. of ethanol. The ethanol was removed under reduced pressure and 500 ml. of $CH_3Cl_3$ was added. The resultant solid was removed (phthalhydrazide), the $CH_3Cl_3$ was removed under reduced pressure and 500 ml. of anhydrous acetone was added. The solid which was not dissolved was removed (more phthalhydrazide). The acetone solu-

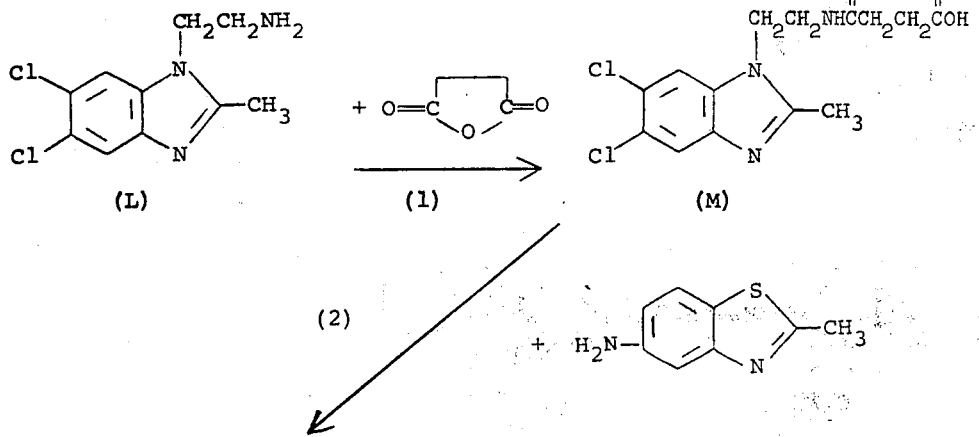

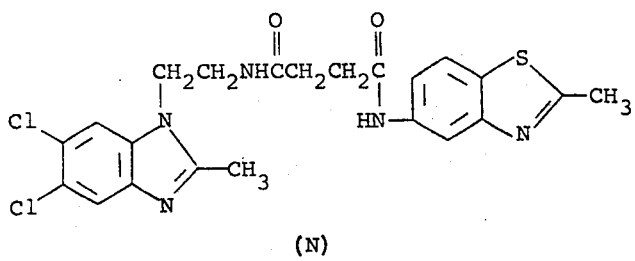

(N)

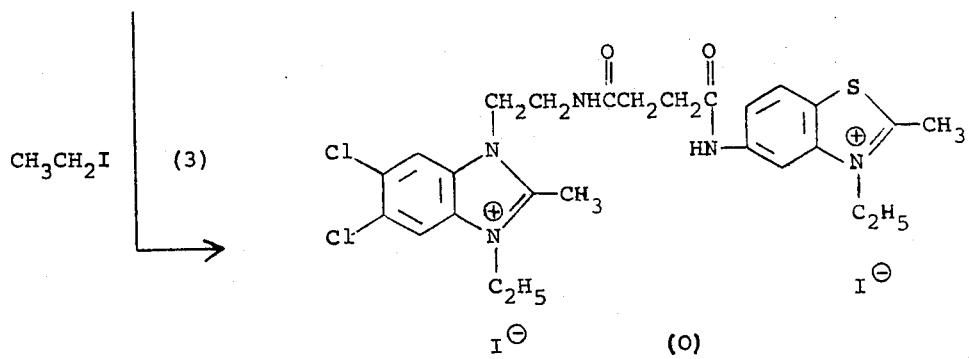

(O)

tion of (L) was brought to a volume of 700 ml.

1. 9 g. of succinic anhydride was added to the above solution of (L) and the resultant solution was refluxed for six hours. During this time a white solid precipitated. The solid was filtered off and washed with acetone and vacuum dried to yield 22 g. (overall 92% yield) of (M); m.p. 213°–214° C.

2. 18 g. of (M) and 8.6 g. of 1-methyl-5-amino benzothiazole were dissolved in 750 ml. anhydrous ETOH under a nitrogen blanket at reflux. This was cooled to 40° and 12.6 g. of N-ethoxycarbonyl-2-ethoxycarbonyl-1,2-dihydroquinoline (EEDQ) was added. The solution was stirred at room temperature overnight during which a white solid precipitated. The solid was filtered off, stirred in acetone and vacuum dried to yield 17 g. of (N). The mother liquor was evaporated down, acetone was added and 3 g. more of (M) was collected (78% yield); m.p. 260°–263° C. When recrystallized from ETOH the m.p. was 268°–269° C.

3. 13 g. of (M) was placed in a 500 ml. "bomb" with 150 g. of ethyl iodide. This was sealed and heated to 130° for 72 hours. Ether was added to the cooled mixture and the solids ground up and filtered. This light yellow solid was washed well with ether and dried to yield 21 g. (100%) of (N) (m.p. 220°–221° C. after refluxing in isopropanol and vacuum drying). The product contained 1/2 mole water. An elemental analysis of O resulted in the following:

| | C | % of Element H | O | N | Cl | S |
|---|---|---|---|---|---|---|
| Found | 38.91 | 3.87 | 4.12 | 8.60 | 8.72 | 3.90 |
| Calculated | 38.90 | 3.86 | 3.91 | 8.72 | 8.85 | 3.91 |

B. Preparation of a "mono dye" from a "double quat"

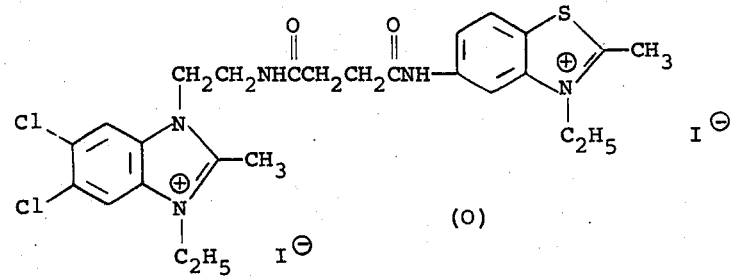

(O)

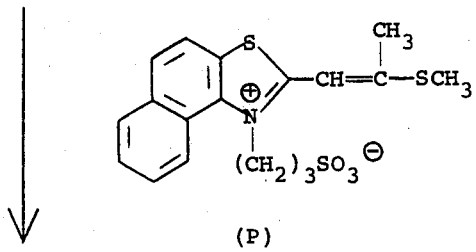

(P)

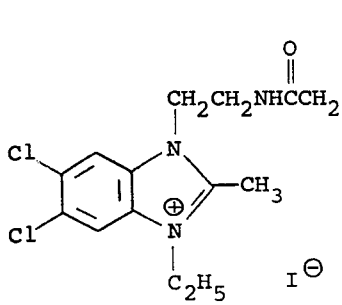 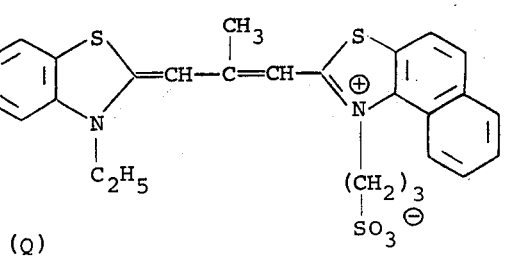

(Q)

1 g. of (O) and 0.5 g. of (P) were heated to 80° C. in 20 ml. of DMSO. Triethylamine was added to this solution, resulting in an immediate color change to purple. The solution was heated to 85° C. for 12 minutes, then 50 ml. of isopropanol was added, the solution stirred for five minutes and then filtered. The resultant dye (Q) was washed with isopropanol, then refluxed in isopropanol for three hours, filtered, refluxed in CHCl₃ for sixteen hours, filtered, refluxed in anhydrous ethanol for three hours, filtered and vacuum dried to yield 1.2 g. (95%). Results of an elemental analysis on the product are as follows:

|  | % of Element | | | | |
|---|---|---|---|---|---|
|  | C | H | %S | %Cl | %I |
| Found | 49.67 | 4.44 | 9.69 | 6.94 | 12.73 |
| Calculated | 50.05 | 4.41 | 9.42 | 6.95 | 12.50 |

C. Preparation of a "double dye" from a "mono dye"

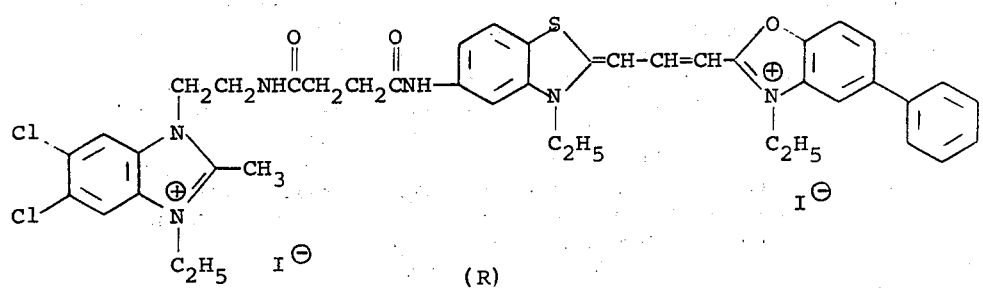

(R)

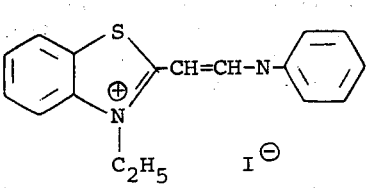

(S)

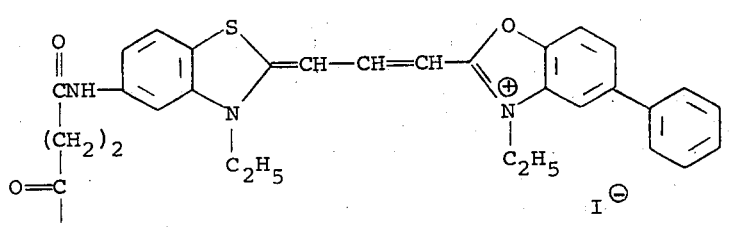

(C)

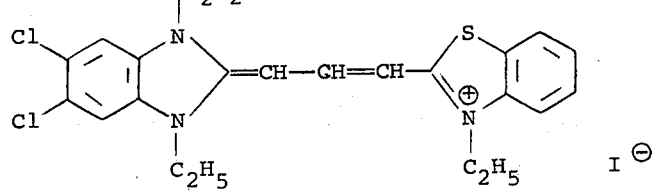

Mono dye (R) was prepared following essentially the same procedure as set forth in Example II above, by condensing compound (O) with a compound of the formula:

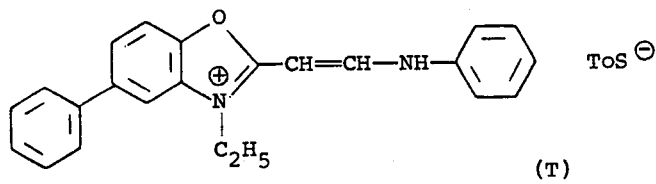

(T)

Then, 0.30 g. of (R) and 0.15 g. of (S) were dissolved in 15 ml. of sulfolane at 120° C. To this solution, 1 ml. of acetic anhydride and triethylamine was added. The resultant mixture was heated ten minutes and then cooled. The solvents were extracted with ether, isopropanol was added to the residue, and then refluxed. The solvent was decanted, more isopropanol added and again brought to reflux. After decanting the solvent, the solid product (C) was broken up, filtered and vacuum dried to yield 0.23 g. (65%). The product contained one mole of water. An elemental analysis of the product (c) was as follows:

EXAMPLE II

Preparation of a "double dye" directly from a "double quat"

1 mol of Compound (O)

+ 2 mol of Compound (S)

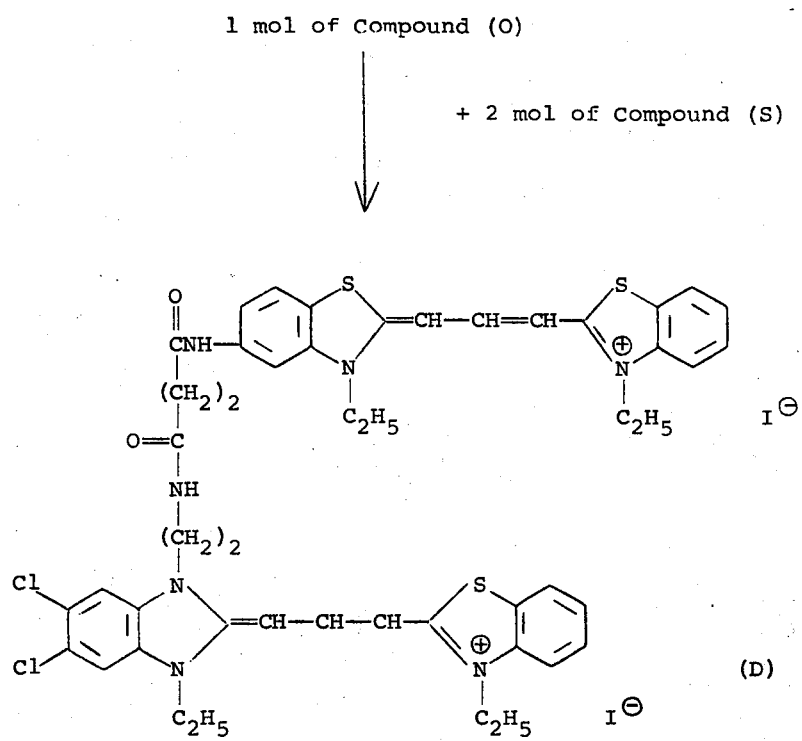

(D)

1 g. of (O) [see Example IA] and 1.1 g. of (S) [see Example IC] were dissolved in 25 ml. of sulfolane. To this solution, 2 ml. of acetic anhydride and triethylamine were added. An immediate color change to purple resulted, the solution was heated for five minutes at 115° C. and then 200 ml. of isopropanol was added. When cooled, a green solid (D) was filtered off, refluxed in isopropanol, filtered and vacuum dried.

EXAMPLE III

Preparation of a double merocyanine dye directly from a "double quat"

| | C | H | % of Element O | N | S | Cl | %I |
|---|---|---|---|---|---|---|---|
| Found | 51.75 | 4.52 | 5.24 | 7.75 | 5.28 | 5.36 | 20.02 |
| Calculated | 51.51 | 4.38 | 5.10 | 7.81 | 5.10 | 5.66 | 20.03 |

1 mol of Compound (O)

+ 2 mols of

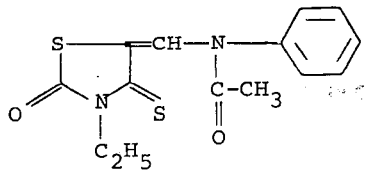

(U)

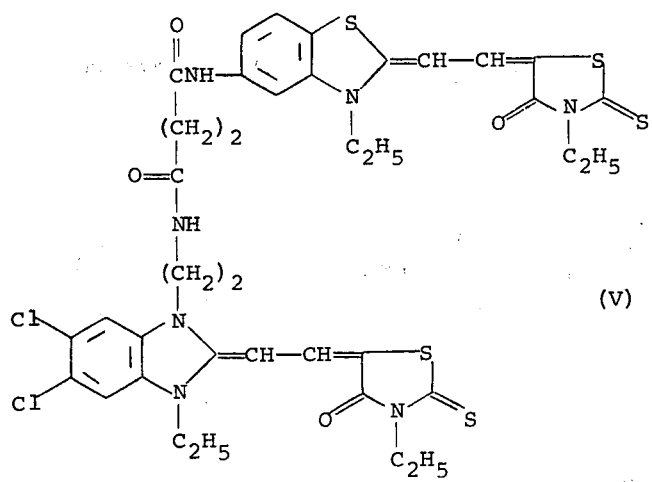

(V)

1.0 g. of (O) and 1.0 g. of (U) were heated to 100°C. in 20 ml. of DMSO for 30 minutes. A magenta color formed immediately. About 100 ml. of water was added and the resultant precipitate was filtered off, washed with water, ethanol and ether. The solid was placed in about 50 ml. of 2-methoxy ethanol, heated to reflux, filtered and the filtrate cooled. Green crystals formed which were filtered and dried to yield about 0.5 g. of (V).

As previously indicated, the linked sensitizing dye compounds of the present invention impart frequency selective electromagnetic radiation response characteristics to and/or increase the inherent spectral response characteristics of a photoresponsive crystal, preferably a silver halide crystal, in the procedure known as optical, or spectral, sensitization. In general, such spectral sensitization procedures are accomplished by the adsorption onto the surfaces of the photoresponsive crystal of one or more of the cyanine dye or dyes related to them. The techniques of incorporating sensitizing dyes such as those of the present invention into photographic silver halide emulsions are well known and disclosed in the art. Typically, the dye is dissolved or otherwise distributed in a suitable medium, such as methanol or pyridine and an appropriate amount of the resulting solution is added to a flowable emulsion and stirred or otherwise agitated until the dye is uniformly dispersed throughout the emulsion. The sensitized emulsion may then be coated, exposed and developed according to the usual photographic techniques.

The photoresponsive material of the photographic emulsion will preferably comprise a crystal of silver, for example, one or more of the silver halides such as silver chloride, silver iodide, silver bromide, or mixed silver halides such as silver chlorobromide or silver iodobromide, of varying halide ratios and varying silver concentrations.

The silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various flocculation systems or procedures, adapted to effect removal of undesired components; afterripening the dispersion at an elevated temperature in combination with the addition of gelatin and various adjuncts, for example, chemical sensitizing agents; all according to the traditional procedures of the art as described, for example, in Neblette, C. B., *Photography Its Materials And Processes*, 6th Ed., 1962.

As the binder for the emulsion, the aforementioned gelatin may be, in whole or in part, replaced with some other natural colloidal material such as albumin; casein; or zein, or synthetic resins such as cellulose derivatives, polyacrylamides, and vinyl polymers.

Additional optional additives, such as coating aids, hardeners, viscosity-increasing agents, stabilizers, preservatives, and the like, also may be incorporated in the emulsion formulation, according to the conventional procedures known in the photographic emulsion manufacturing art and described in a multiplicity of U.S. and foreign patents. Examples of such optional additives include chemical sensitizers (e.g., reducing agents, sulfur, selenium or tellurium compounds; gold, platinum or palladium compounds, or combinations of these), stabilizers and antifoggants (e.g., noble metal salts such as rubidium, rhodium, palladium, iridium and platinum; mercury compounds; triazoles; azaindenes; disulfides, benzothiazolium compounds; zinc and cadmium salts; mercapto compounds, etc.), speed-increasing compounds (e.g., quaternary ammonium compounds, polyalkylene glycols, thiopolymers and thioethers, cationic surface active agents, or combinations of these), hardening agents (e.g., inorganic agents providing polyvalent metallic atoms such as potash alum and chrome alum; aldehydes such as formaldehyde, glyoxal, mucochloric acid; blocked aldehydes, ketones; quinones, carboxylic and carbonic acid derivatives; sulfonate esters; sulfonyl halides, vinyl sulfones, active halogen compounds; epoxy compounds, aziridines; active olefins, isocyanates, carbodiimides; mixed function hardeners and polymeric hardeners such as oxidized polysaccharides; etc.), coating aids (e.g., saponin; a polyethylene glycol; a polyethylene glycol ether; a taurine; a maleopimarate; an amino acid; a sulfosuccinate; a polyether; a gelatin plasticizer such as glycerin; a dihydroxyalkane; a bisglycolic acid ester; a succinate; a polymeric hydrosol; silicone resins; alkyl aryl sulfonates; etc.), auxiliary developing agents (e.g., hydroquinones such as 4'-methylphenylhydroquinone, catechols, aminophenols, 3-pyrazolidone, ascorbic acid and its derivatives, reductones and phenylenediamines, or combinations of developing agents); and the like.

The emulsion may be coated onto various types of rigid or flexible supports, for example, glass, paper, metal, polymeric films of both the synthetic types and those derived from naturally occurring products, etc. Especially suitable materials include paper; aluminum; polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetatebutyrate, or acetate-propionate; polycarbonates; polystyrenes; etc.

The emulsions of this invention can be coated by the various coating procedures in the art such as dip coating, air knife coating, curtain coating, extrusion coating, etc.

Optical sensitization of the dispersion's silver halide crystals may be accomplished by contact of the emulsion composition with an effective concentration of the selected linked sensitizing dyes of the invention, which dyes have preferably been dissolved in an appropriate solvent all according to the traditional procedures set forth in the art. In general, the concentration of sensitizing dye may be varied empirically in accordance with the characteristics of the particular photoresponsive material, such as the silver halide selected and the sensitizing effects desired. In the instance of preferred silver iodobromide dispersions, the concentration of a dye of the present invention will ordinarily fall within the range of about 0.05 to 5 grams of sensitizing dye per 100 grams of silver halide measured as silver, and preferably in the range of about 3 to 4 grams per 100 grams of silver.

The photographic emulsions may be employed in a wide variety of black-and-white or color photographic systems, of both the additive and subtractive types, for example, those described in Photography, Its Materials And Processes, supra. The photoresponsive crystals may be employed in the fabrication of photographic emulsions which form latent images predominantly on the surface of the crystal or in emulsions which form latent images predominantly inside the crystal such as those described in U.S. Pat. No. 2,592,250.

The fabricated emulsions may also be employed in silver diffusion transfer processes of the types set forth in for example, U.S. Pat. Nos. 2,500,421; 2,543,181; 2,565,376; 2,962,377; 3,003,875; and 3,113,866; in additive color diffusion transfer processes of the types disclosed, for example in U.S. Pat. Nos. 2,614,926; 2,726,154; 2,944,894; 2,992,103 and 3,087,815; and in subtractive color diffusion transfer processes of the types disclosed in U.S. Pat. Nos. 2,774,668; 2,802,735; 2,968,554; 2,983,606; 3,019,104; 3,039,869; 3,345,163; etc.

The photoresponsive crystals of the present invention may also be employed as the photosensitive component of information recording elements which employ the distribution of a dispersion of relatively discrete photoresponsive crystal, substantially free from interstitial binding agents, on a supporting member such as those previously designated, to provide image recording elements, for example, as described in U.S. Pat. Nos. 2,945,771; 3,142,566; 3,142,567; Newman, Comment on Non-Gelatin Film, B. J. O. P., 534, Sept. 15, 1961; and Belgian Pat. Nos. 642,557 and 642,558.

The photoresponsive crystals of the present invention may also be employed as the photoconductive component of electrophotographic materials, for example, inorganic photoconductive crystals such as zinc oxide, selenium, cadmium sulfide, cadmium telluride, indium oxide, antimony trisulfide, and the like, and organic photoconductive crystals such as anthracene, sulfur, benzidine, the aromatic furanes of U.S. Pat. No. 3,140,946, and the like, as described in U.S. Pat. Nos. 2,987,395; 3,047,384; 3,052,540; 3,069,365; 3,110,591; 3,121,008; 3,125,447; and 3,128,179.

One particularly advantageous system for linked cyanine dyes of the present invention is disclosed, for example, in Bird et al, U.S. Pat. No. 3,622,317, issued Nov. 23, 1971. In accordance with the teachings of said patent, a radiation-less circuit capable of transmitting increased amounts of photon-excitation derived energy to the photoresponsive crystal is provided by spectrally sensitizing the photographic emulsion with so-called "pseudo-polymeric" cyanine dyes comprising linked nonrepetitive cyanine dye segments, each possessing a higher, yet overlapping, intrinsic energy absorption frequency range than that of the immediately preceding segment. Since it is known that the sensitizing property of a cyanine dye does not increase proportionately with the concentration of the dye, but rather passes through a maximum which occurs at a dye concentration level corresponding to less than or equal to a monomolecular layer of dye coverage on the absorbing surfaces of the crystal, the employment of linked cyanine dyes within the scope of this invention may provide a means by which the photoresponse of the crystal can be increased over that corresponding to said monomolecular coverage. A more detailed discussion of this particular utility may be obtained from the above-mentioned Bird et al patent which is incorporated herein by reference.

Following the teachings of Bird et al, one may wish to tailor the linked cyanine dyes of this invention for the use disclosed therein. For example, preferred linked dyes of the invention may comprise a red-sensitizing dye segment, absorbing in the wavelength range from about 600 to 700 nm, linked through the amide bond moiety to a green-sensitizing dye segment absorbing in the wavelength range from about 500 to 600 nm. As examples of preferred red-sensitizing cyanine dyes, mention may be made of sulfoalkyl-substituted symmetrical benzothiazolocarbocyanine dyes, e.g., as described in Sprague, U.S. Pat. No. 2,503,776; and as examples of preferred green-sensitizing cyanine dyes for linking therewith in accordance with the present invention, mention may be made of the unsymmetrical benzimidazolo-thiacarbocyanine dyes disclosed in the copending application of Borror et al, Ser. No. 430,222, filed Jan. 2, 1974.

As disclosed in said Bird et al patent, the linked cyanine dye compound may be tailored not only according to the spectral radiation absorptive properties of the sensitizing dye segments as just described, but also according to the adsorptive propensities of the segments, in order to assure that the compound adsorbs onto the surfaces of the crystals in the proper manner. It is stated in said patent that the most tenaciously adsorbed cyanine dyes to photographic silver halides comprises those of the selenazole series with those of the thiazole, oxazole and imidazole series following in descending order. It is further stated that the cyanine dye segment end most distal from the crystal may preferably include a substituent which inherently retards adsorption of that end to the crystal, e.g., groups which provide a steric effect such as long carbon chains or aryl groups, and/or electronegative groups such as cyano.

As regards the length of the linking group, said Bird et al patent teaches that the relative distance between the cyanine dye segments should be no more than about 100 A, and for all practical purposes the absolute outside limit of the distance between segments is about 200 A, in which case the energy transfer efficiency is reduced by about 98%. As previously stated, the intersegmentary distance in linked cyanine dyes of this invention may be readily changed to suit particular requirements by varying the number of alkylene or amide groups, or the size of the alkylene groups introduced into the linking group. The total length of the linking group, as taught by Bird et al, will ultimately have to be determined in terms of efficiency in providing the desired energy circuit for photographic utilization, giving due consideration to the point of attachment of the linking group to the respective cyanine dye segments since nuclear and extranuclear attachment points will bear different spatial relationships toward adjacent segments of the linked cyanine dye compound.

Since certain changes may be made in the above products and processes without departing from the scope of the invention herein involved, it is intended that all matter contained in the above description shall be interpreted as illustrating and not in a limiting sense.

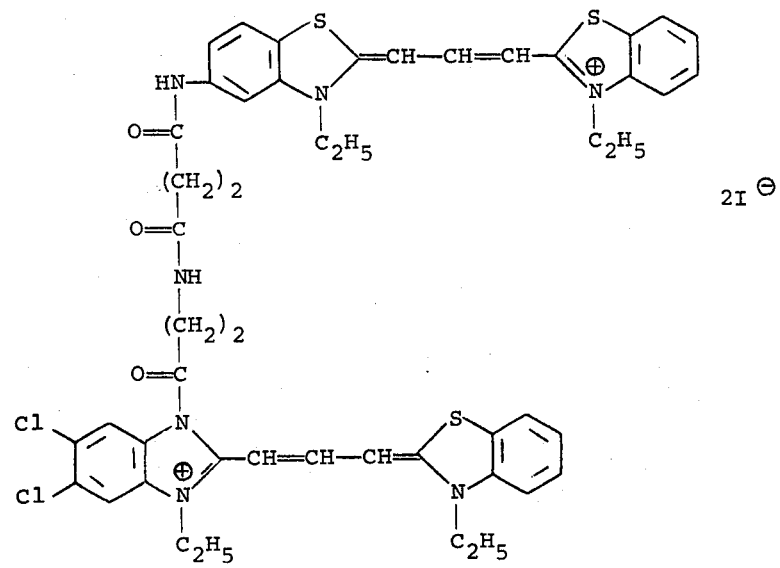

5. A silver halide emulsion containing a spectral sensitizing dye of the formula:
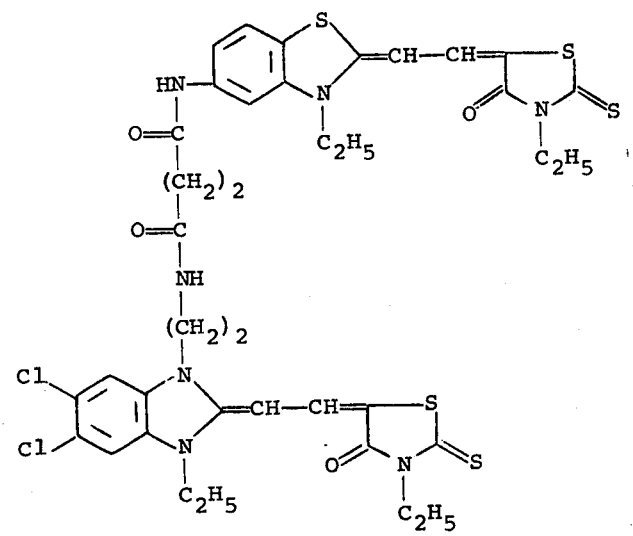

What is claimed is:

1. A photosensitive composition comprising photosensitive silver halide crystals and a spectral sensitizing dye of the formula:

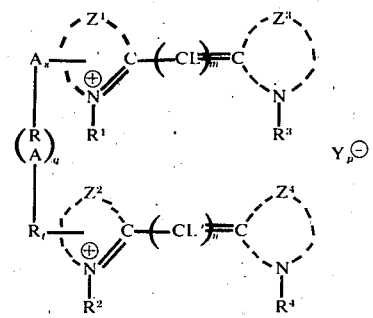

wherein $Z^1$ is a ring system of the benzothiazole series; $Z^2$ is a ring system of the benzothiazole or benzimidazole series; $Z^3$ is a ring system of the benzothiazole, benzimidazole, benzoxazole or benzoselenazole series and $Z^4$ is a ring system of the benzothiazole series;

$R^1$, $R^2$, $R^3$ and $R^4$ each represent an alkyl, alkoxyalkyl, arakyl, carboxyalkyl, sulfoalkyl, carbalkoxyalkyl, aryl, carboxyaryl or cycloalkyl group;

R represents an alkylene group; A represents a divalent amide group; A and R are each linked to an atom of the ring system defined by $Z^1$ and $Z^2$ respectively; L and L' each represent a hydrogen atom, lower alkyl group, or aryl group; Y is an acid anionic radical; m and n are each a positive integer from 1 to 7 inclusive; s and t are each 0 or 1; and p and q are each 0, 1 or 2; when s is 0, q is 1 or 2, and when q is 0, s is 1.

2. A silver halide emulsion containing a spectral sensitizing dye of the formula:

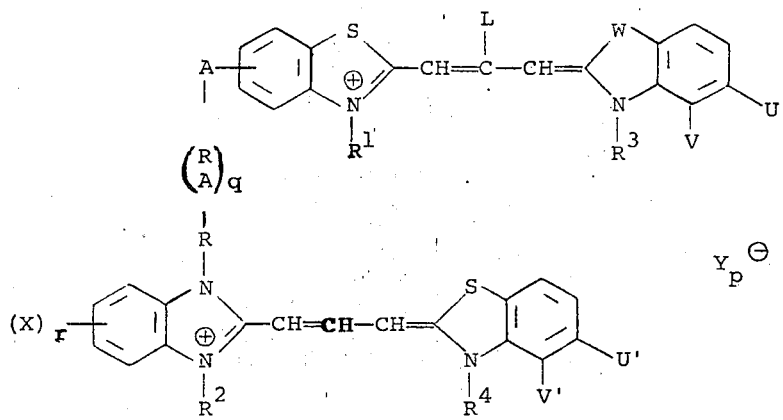

or

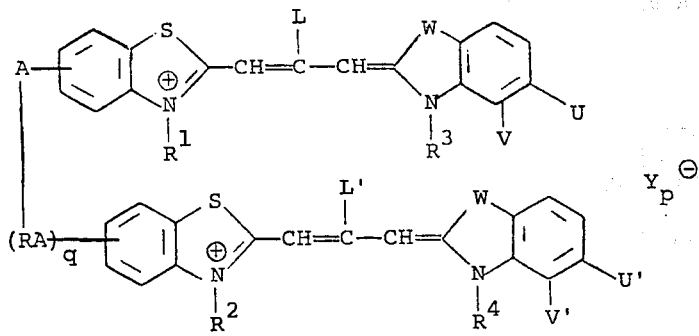

wherein $R^1$, $R^2$, $R^3$ and $R^4$ are each lower alkyl, sulfoalkyl or carboxyalkyl; A is a divalent amide group; R is an alkylene group having from 1 to 5 carbon atoms; L and L' are each a hydrogen atom or lower alkyl group; W is S, O, Se or N–T wherein T is a hydrogen atom or a lower alkyl group; X is hydrogen, halo, cyano or carbalkoxy, r is 1 or 2; U and U' are each hydrogen, a lower alkyl group, phenyl or cyano; and V and V' are each hydrogen; or U and V taken together and/or U' and V' taken together represent a fused phenylene nucleus; Y is an acid anionic radical; and p and q are each 0, 1 or 2.

3. A silver halide emulsion as defined in claim 2 wherein said sensitizing dye is represented by the formula:

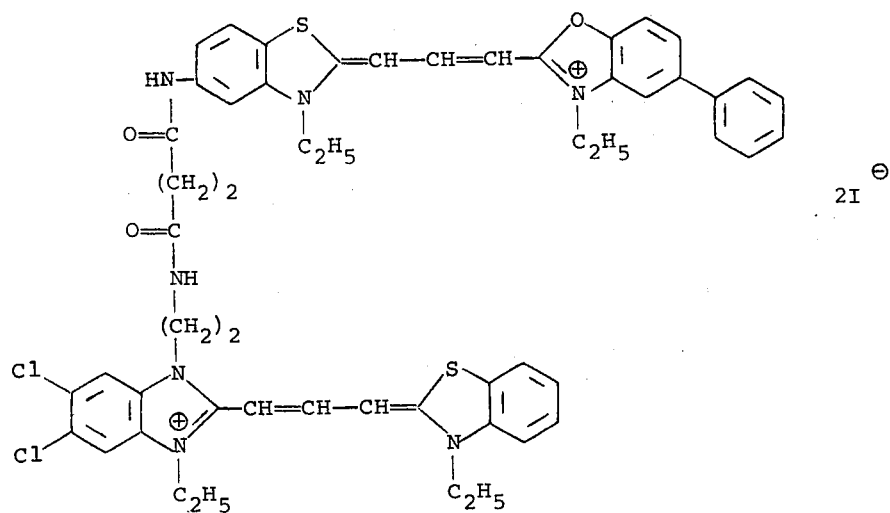

4. A silver halide emulsion as defined in claim 2 wherein said sensitizing dye is represented by the formula: